United States Patent Office 3,827,879
Patented Aug. 6, 1974

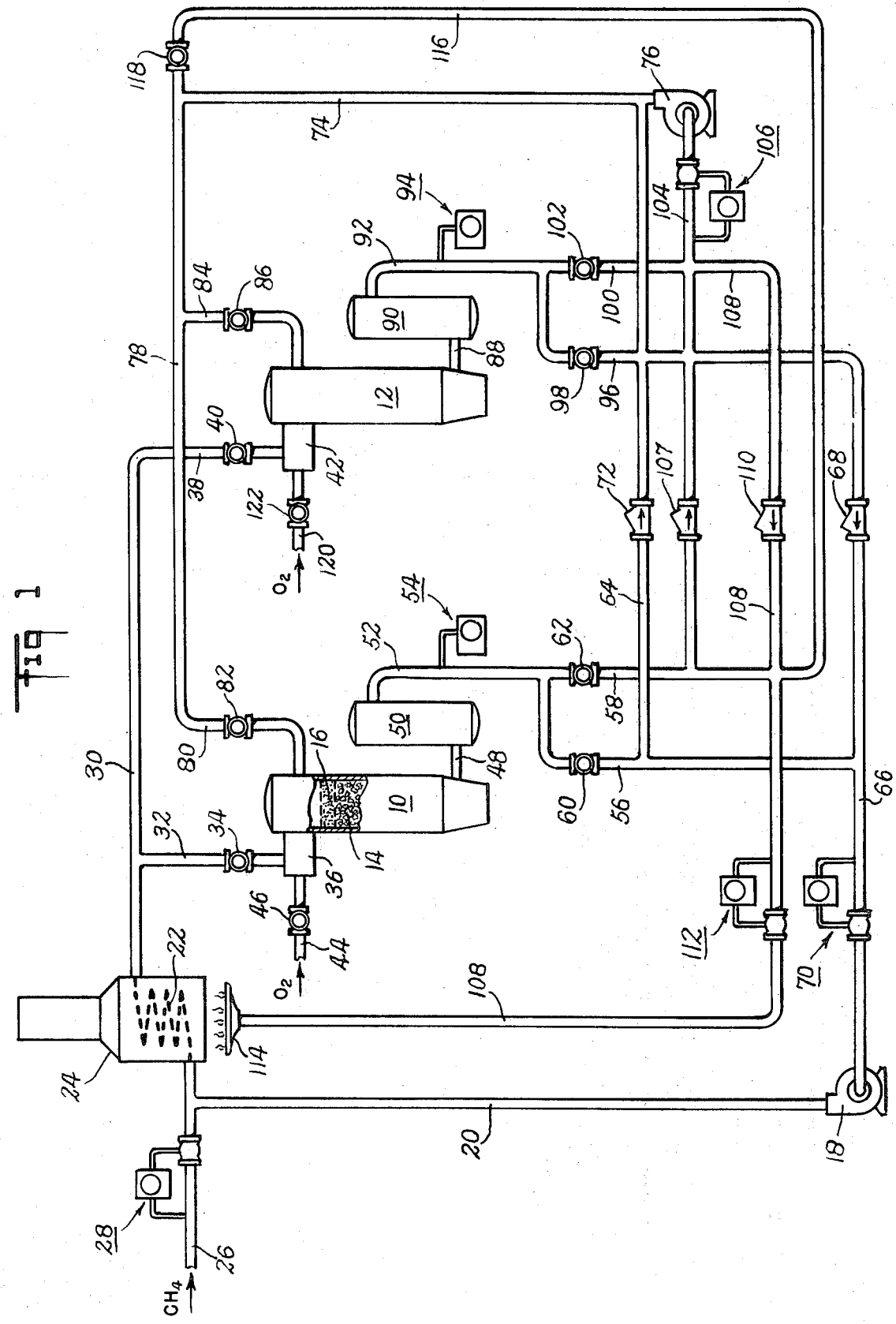

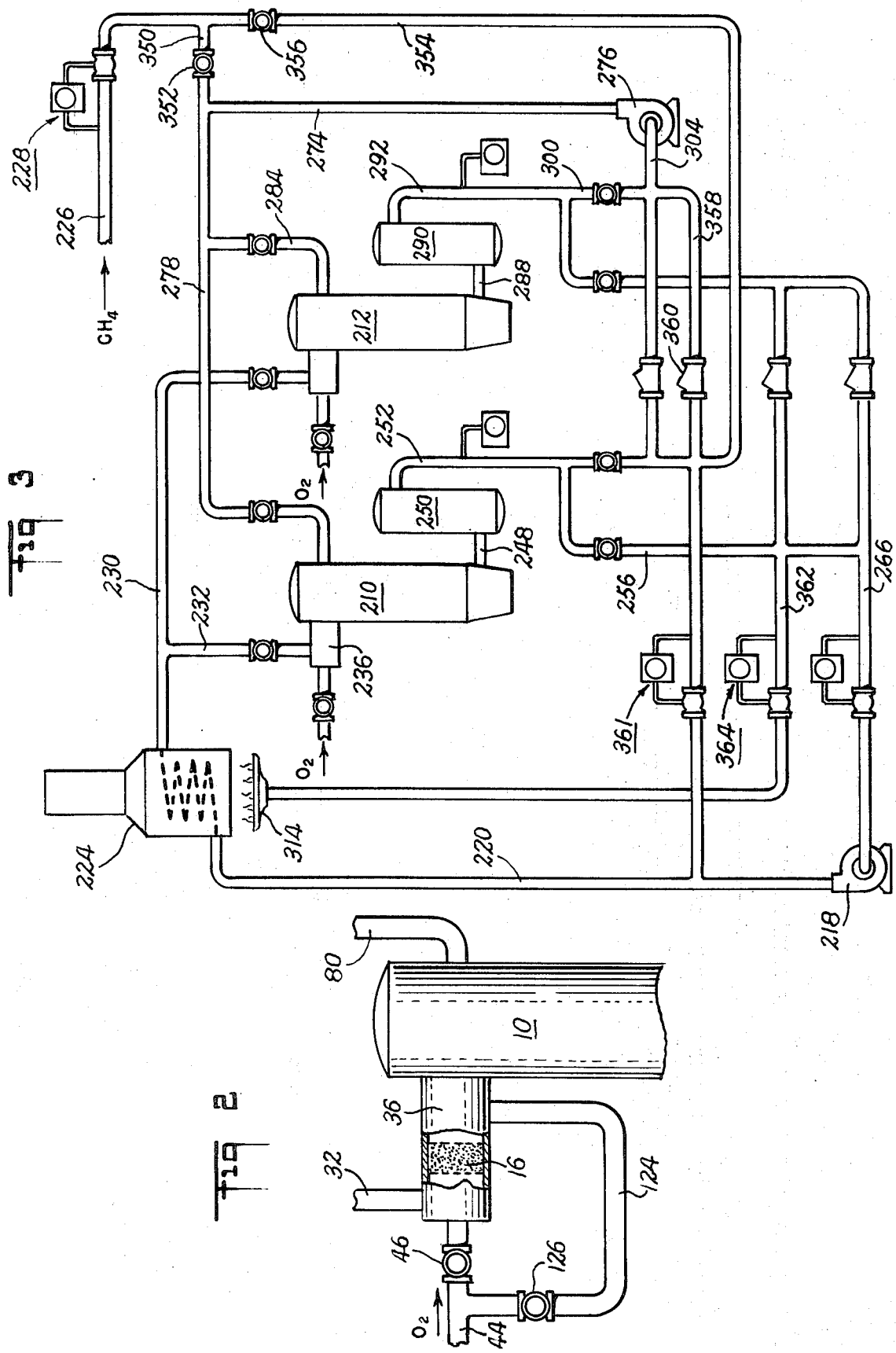

3,827,879
METHOD FOR THE GASEOUS REDUCTION OF METAL ORES
Juan Celada, Monterrey, Jesus Maria Pena, San Nicolas de los Garza, Nuevo Leon, and Patrick W. MacKay, Ramon de la Pena, Enrique Ramon Martinez, and Maria Teresa de la Torre, Monterrey, Nuevo Leon, Mexico, assignors to Fierro Esponja, S.A., Monterrey, Nuevo Leon, Mexico
Filed Feb. 22, 1973, Ser. No. 334,670
Int. Cl. C21b 13/02
U.S. Cl. 75—35          19 Claims

ABSTRACT OF THE DISCLOSURE

A method for the gaseous reduction of iron ore to sponge iron in a multi-stage reactor system comprising a reduction reactor containing a fixed bed of ore to be reduced and a cooling reactor containing a fixed bed of reduced ore to be cooled, wherein separate circuits are established for recycling gas through each reactor, natural gas or methane is fed to one of said circuits and partially oxidized to form a reducing gas mixture consisting essentially of 14 to 40% carbon monoxide, 4 to 40% carbon dioxide, 14 to 50% hydrogen and 10 to 60% methane, reducing gas is continuously transferred from one of said circuits to the other and continuously removed from the other of said circuits. A reduction plant having a high yield of sponge iron per hour per cubic foot of reduction space is achieved, at relatively low capital outlay and the plant can be easily scaled up from say 20 tons per day to 1200 tons per day.

---

This invention relates to the gaseous reduction of metal ores to sponge metal at temperatures below the melting point of the metal and more particularly to improvements in a known multi-stage, semi-batch gaseous reduction process of the type described below. It has been found that the present process is especially useful in the gaseous reduction of iron ore to sponge iron and for convenience the process will be illustratively described as applied to the reduction of iron ore. However, as the description proceeds, it will become apparent that the process may be equally well applied to the gaseous reduction of other metal ores to sponge metals.

It is known that iron ore can be effectively and efficiently reduced to sponge iron in a multi-stage reactor system comprising a plurality of reduction reactors and a cooling reactor containing fixed beds of metal-bearing materials and in which the ore is reduced and the resulting sponge iron simultaneously cooled by passing a reducing gas composed largely of hydrogen and carbon monoxide through the body of sponge iron in the cooling reactor, heating the reducing gas and passing it successively and in series through the ore bodies in the reduction reactors. The reducing gas used in such processes is commonly generated in a catalytic reformer wherein a mixture of steam and natural gas largely composed of methane is catalytically converted to hydrogen and carbon monoxide in accordance with the following equation:

$$H_2O + CH_4 \rightarrow 3H_2 + CO$$

As indicated by the foregoing equation, the resulting gas mixture has a relatively high proportion, e.g., 70% or more, of hydrogen. Such multistage, fixed bed processes are disclosed, for example, in Celada U.S. Pat. 2,900,247 and Mader et al. U.S. Pats. 3,136,623, 3,136,624 and 3,136,625. While such processes have been extensively used and have enjoyed considerable success, they are subject to a number of disadvantages as outlined below.

In such processes it has been customary to use in addition to the reformer for generating the reducing gas a series of four reactors including a cooling reactor, a primary stage reduction reactor, a secondary stage reduction reactor and a "turn-around" reactor from which the reduced sponge iron is removed and into which fresh ore is charged during the period in which the reduction and cooling operations are being carried out in the other reactors of the series. Thus in such a process a relatively large capital investment is required in relation to the tonnage of ore produced.

This process also fails to take adequate advantage of the reduction potential of the methane used as a feed gas to the system. In theory the reduction potential of methane per mole of gas is four times as great as that of carbon monoxide or hydrogen as illustrated by the following equations:

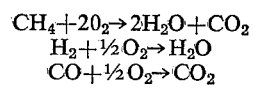

In other words, as a medium for transporting reduction potential by diffusion through the pores of a partially reduced piece of iron ore to the interior portions which are still to be reduced, four times as much reduction potential per molecule is transported by methane as by carbon monoxide or hydrogen.

However, at the operating temperature of the reactor, methane *per se* is unstable and decomposes to form soot on the surface of the ore particles. This soot tends to block the pores of the ore particles in the reduction reactor and reduce the reduction efficiency thereof. If, for example, the reformer of the prior process described above is so operated that the effluent gas therefrom contains as much as 10% of methane, this amount of methane in the feed gas to the primary reduction reactor produces a soot deposition problem and significantly impairs the reduction efficiency of the reduction reactors.

It has also been found in connection with the prior process described above that during the later stages of the cooling operation in the cooling reactor there is a tendency for methane to be formed according to the following equation:

$$CO + 2H_2 \rightarrow CH_4 + H_2O$$

Since this methanation reaction is exothermic, it tends to retard the cooling process in the cooling reaction.

It is accordingly an object of the present invention to provide an improved process for the reduction of metal ores of the general type described above. It is another object of the invention to provide such a process which can be carried out in simpler and less costly apparatus. It is still another object of the invention to provide a process wherein the reduction potential of the methane or other hydrocarbon gas used as a starting material in preparing the reducing gas is more effectively used. It is a still further object of the invention to provide a process wherein the exothermic formation of methane in the cooling step of the process is inhibited. It is still another object of the invention to provide a process wherein the nature of the reducing gas composition fed to the reduction reactor is such that the reduction reaction is less endothermic than in the prior process described above, thereby providing a higher average reduction temperature in the reactor for a given inlet gas temperature. Other objects of the invention will be in part obvious and in part pointed out hereafter.

The objects and advantages of the present invention are achieved, in general, by utilizing a reducing gas having a relatively high methane content under such conditions that at the operating temperature of the reduction reactor the methane is stabilized against destructive decomposition and little, if any, carbon in the form of soot is deposited on the surface of the ore particles. The catalytic reformer of the prior process described above is eliminated and a reducing gas circuit is established through which the reducing gas is recycled. This circuit comprises the reduction reactor containing a body of ore through which the reducing gas passes, a cooler for cooling the circulating gas to remove water therefrom, a gas circulating pump, a preheater for heating the circulating gas to a temperature of 700° to 900° C., and a combustion chamber communicating with the inlet of the reduction reactor. An oxygen-containing gas, preferably relatively pure oxygen, is mixed with the gas flowing through the combustion chamber to burn a portion of the gas flowing therethrough to heat the gas mixture to a temperature of 800° to 1200° C., preferably 900° to 1100° C., and also to convert a portion of the methane in the mixture to carbon monoxide and hydrogen.

Natural gas, methane or other hydrocarbon gas is used as a make-up gas, and cooled reactor effluent gas is withdrawn from the circuit in a manner described in detail below. The natural gas or methane used as a make-up gas is desirably desulfurized before being fed to the system. In order to stabilize the methane in the circulating gas against destructive decomposition, the gas composition is so controlled that it consists essentially by volume of 15 to 40% carbon monoxide, 15 to 50% hydrogen, 5 to 40% carbon dioxide and 10 to 60% methane. The gas also contains variable but relatively small amounts of water which do not appear to affect the stability of the methane at high temperature. Control of the gas composition is effected by regulating the flow of make-up methane and the flow of oxygen-containing gas to the combustion chamber, as well as the gas recirculation rate and temperature.

In connection with the description of the prior process given above wherein a reducing gas is generated by catalytic conversion of a mixture of steam and methane to carbon monoxide and hydrogen, it was pointed out that the reducing gas mixture thus produced contains a high proportion, i.e., 70% or more, of hydrogen. It is known that hydrogen is characterized by a high initial and overall reduction velocity for iron oxides, which is of the order five times the reduction velocity obtained with carbon monoxide. Thus it would be expected that when the proportion of hydrogen in the reducing gas is substantially reduced, the yield of reduced product per hour per cubic foot of ore bed would likewise be reduced. However, it has been found surprisingly that when using a gas containing a substantially reduced amount of hydrogen and a substantial amount of methane in accordance with the present process, a comparable yield of reduced product per hour per cubic foot of ore bed is achieved.

In a preferred embodiment of the invention, the process of the invention is carried out in two reactors, namely, a reducing reactor in which the ore is reduced and a cooling reactor in which reduced ore from a previous cycle is simultaneously cooled. When only two reactors are used, the system is so operated that cooling of the reduced ore is completed in a shorter period of time than the time required to reduce the ore in the reduction reactor. This time difference is such that the cooled sponge iron can be discharged from the cooling reactor and the cooling reactor charged with fresh ore by the time the reduction cycle has been completed in the reduction reactor. The two reactors are so interconnected that at the end of a reduction cycle they can be functionally interchanged. That is to say, the cooling reactor becomes a reduction reactor and the reduction reactor becomes a cooling reactor. Thus both reactors are in substantially continuous use and efficient utilization of the equipment is achieved.

The many objects and advantages of the present invention can best be understood and appreciated by reference to the accompanying drawings which illustrate in an essentially diagrammatic manner apparatus capable of being used to carry out the method of the invention.

In the drawings:

FIG. 1 is a flow sheet illustrating a preferred embodiment of the present process and showing the manner in which the reactors are interconnected;

FIG. 2 illustrates a modification of the upper portion of a reactor and its associated combustion chamber wherein a body of catalyst is positioned in the combustion chamber;

FIG. 3 illustrates a modification of the system of FIG. 1 wherein the make-up methane is added to the recycled cooling gas rather than the recycled reducing gas.

Referring to FIG. 1, the ore reduction system there shown comprises the reactors 10 and 12. The system will initially be described with reactor 10 operating as a reduction reactor and reactor 12 as a cooling reactor. The reactor 10 contains a body of iron ore 14 to be reduced and overlying the iron ore 14 a layer of sponge iron 16, the function of which will be described hereafter.

As indicated above, the ore reducing portion of the system comprises a reducing gas circuit in which the reducing gas is recycled, and a hydrocarbon gas, such as methane or natural gas is introduced into the circuit as make-up gas. Referring to the lower left-hand portion of FIG. 1, circulating reducing gas consisting essentially of carbon monoxide, hydrogen, carbon dioxide and methane is pumped by a pump 18 through a pipe 20 to the coils 22 of a gas-fired heater 24. Before entering the heater 24 the circulating gas is mixed with methane which is supplied from a suitable source through a pipe 26 to the pipe 20. The pipe 26 contains a flow controller 28 for controlling the flow of methane into the reducing gas circuit. The volumetric flow ratio of recycled gas to added methane may vary over a fairly wide range of say 1:1 to 10:1. The mixed gas entering heater 24 preferably consists essentially of 15 to 50% hydrogen, 14 to 40% carbon monoxide, 4 to 40% carbon dioxide and 10 to 60% methane.

Within the gas heater 24 the mixed gas is heated to a temperature of 700° to 900° C. and flows to reducing gas header 30. The header 30 is connected by branch pipe 32 containing a shut-off valve 34 to a combustion chamber 36 that communicates with the upper portion of reactor 10 and by a branch pipe 38 containing a shut-off valve 40 to the combustion chamber 42 of reactor 12. During the cycle here being described valve 40 is closed and valve 34 is open.

Within combustion chamber 36 the gas is mixed with a minor amount of oxygen-containing gas supplied from a suitable source through a pipe 44 containing a regulating valve 46. The oxygen-containing gas may be air or air-oxygen mixtures but is preferably relatively pure oxygen to avoid a build-up of nitrogen in the reducing gas circuit. The added oxygen reacts with circulating gas to raise its temperature to the order 900° to 1100° C., preferably about 1000° C. and also converts a portion of the methane content thereof to carbon monoxide and hydrogen according to one or more of the following reactions:

$$2CH_4 + O_2 \rightarrow 2CO + 4H_2$$
$$CH_4 + O_2 \rightarrow CO_2 + 2H_2$$
$$2CH_4 + 3O_2 \rightarrow 2CO + 4H_2O$$

From the combustion chamber 36 the hot gas flows into reactor 10 and initially through the layer of sponge iron 16. At the temperature existing in this portion of the reactor the sponge iron acts as a catalyst to convert a further portion of the methane to carbon monoxide and hydrogen according to the following equations:

$$CH_4 + H_2O \rightarrow CO + 3H_2$$
$$CH_4 + CO_2 \rightarrow 2CO + 2H_2$$

It is, of course, unnecessary to separate the sponge iron catalyst layer from the other iron-bearing material in the reactor when the reactor is discharged, since sponge iron is the product being produced.

The gas then flows downwardly through the ore body 14 and the reducing components thereof, namely, methane, hydrogen and carbon monoxide, reduce the ore of the ore body. The gas composition is such that the methane is stabilized against destructive decomposition and little, if any, soot formation takes place. Also since the hydrogen content of the gas is well below that of the gas used in the prior process described above and since the hydrogen reduction reaction is strongly endothermic, there is less temperature drop through the bed than in the prior process and the bed operates at a higher average temperature. It is further believed that as the gas diffuses into the pores of partially reduced ore particles, the methane at the iron-iron oxide reaction interface may react with water and carbon dioxide to produce hydrogen and carbon monoxide within the pores of the particles.

The effluent gas leaves the reactor though a pipe 48, flows through a cooler 50 wherein it is cooled and dewatered and then through a pipe 52 containing a flow meter 54. Pipe 52 is connected to two branch pipes 56 and 58 containing shut-off valves 60 and 62, respectively. During the cycle here being described valve 60 is open and valve 62 is closed. A portion of the cooled gas flowing through branch pipe 56 is removed from the reducing gas circuit and transferred through pipe 64 to the cooling gas circuit of reactor 12 in a manner described more fully below. The main portion of the cooled gas flows to pipe 66 which is provided with a flow controller 70 and thence to the suction of circulating pump 18. Rightward flow of gas in pipe 66 is prevented by a check valve 68. The rate of recirculation of gas through the reducing gas circuit may be varied by adjusting the setting of flow controller 70.

The gas flowing through pipe 64 passes through a check valve 72 and enters the cooling gas circuit and more particularly the discharge pipe 74 of a cooling gas recirculating pump 76. Pipe 74 leads to a cooling gas header 78 which is connected by a branch pipe 80 containing a shut-off valve 82 to the top of reactor 10 and by a branch pipe 84 containing a shut-off valve 86 to the top of reactor 12. During the cycle here being described, valve 82 is closed and valve 86 is open. Thus all of the circulating cooling gas flows into reactor 12.

The cooling gas flows downwardly through the body of reduced ore in reactor 12 and cools it. During the early part of the cooling cycle when the reduced ore is at a relatively high temperature, a certain amount of cracking of the methane occurs to produce hydrogen and carbon which is deposited in the sponge iron and carburizes it. As disclosed in the Mader et al. patents referred to above, this increase in the carbon content of the sponge iron is desirable where the sponge iron is to be used as a source of iron units in an electric arc steel-making furnace.

As indicated above, when a gas having a high content of hydrogen and carbon monoxide, such as that used in the prior process described above, is employed as a coolant, there is a tendency for the carbon monoxide and hydrogen to form methane as the gas passes through the ore body, particularly as the temperature of the reduced ore body decreases as the result of the cooling effect of the cooling gas. This methanation reaction is exothermic and therefore tends to retard cooling of the reduced ore. By using a gas containing a substantial amount of methane this reaction is inhibited and more rapid cooling of the reduced ore is achieved for a given mass flow of cooling gas.

The effluent gas from reactor 12 passes through pipe 88 to cooler 90 wherein it is cooled and dewatered and thence to pipe 92 containing flow meter 94. Pipe 92 is connected to branch pipe 96 containing shut-off valve 98 and branch pipe 100 containing shut-off valve 102. During the cycle here being described the valve 98 is closed and the valve 102 is open. Thus the cooling gas flows through pipe 100 and then through pipe 104 containing flow controller 106 to the suction side of the cooling gas recirculating pump 76 thus completing the cooling gas circuit through the cooling reactor 12. Leftward flow of gas through the pipe 104 is prevented by a check valve 107.

As in the case of the reduction reactor circuit, the volumetric ratio of recirculated cooling gas to cooling gas entering the circulating system through pipe 64 can be varied over a relatively wide range and may vary from say 1:1 to 10:1. Since gas enters the cooling gas circuit continuously through transfer pipe 64, it is necessary, in order to maintain a substantially constant pressure within the cooling gas circuit, to remove gas from the circuit. Removal of gas from the cooling gas circuit is effected at a point at or near the intersection of pipes 100 and 104 through a pipe 108 containing a check valve 110 and back pressure regulator 112 to maintain a substantially constant gas pressure in the cooling gas circuit. In FIG. 1 the gas removed through pipe 108 is illustratively shown as supplying fuel to the burners 114 of the heater 24. However, all or part of the gas removed through pipe 108 can be used as a fuel gas for other purposes.

The desired cooling of the reduced ore in reactor 12 takes place in a shorter interval of time than the reduction of the ore in reactor 10. Hence upon the completion of the cooling of the reduced ore, there is an interval of time during which the cooled sponge iron can be removed from the reactor 12 and the reactor charged with fresh ore. During this discharging and charging operation the reactor is isolated from the rest of the system by closing valves 86 and 102. Since reducing gas from the reducing gas circuit continues to flow into the cooling gas circuit through transfer pipe 64, it is necessary to provide for the removal of this gas from the system. Such removal is effected at a point at or near the intersection of pipes 74 and 78 through a pipe 116 containing a shut-off valve 118 which is opened at the end of the cooling gas cycle to permit gas to flow through pipe 116 to the pipe 108 and thence to the burners 114, if desired.

Th reactors 10 and 12 are desirably so operated that the time interval required for reducing the ore in reactor 10 is approximately equal to the sum of the time interval required for cooling the reduced ore in reactor 12 and the interval required for discharging the reduced ore or sponge iron from reactor 12 and recharging the reactor with fresh ore. For example, the reduction cycle may be four hours, the cooling cycle three hours and the charge and discharge cycle one hour. In this way the equipment can be fully and substantially continuously utilized. The time intervals required for reduction of the ore and cooling of the reduced ore can be adjusted to effect the desired relationship by adjustment of such variables as gas composition, the recycle ratios in the reduction and cooling gas circuits and the degree of cooling in coolers 50 and 90.

At the end of a cycle as described above, the reactors 10 and 12 are functionally interchanged, that is to say, the reactor 12 becomes a reduction reactor and the reactor 10 a cooling reactor. To effectuate this change in function, valves 34, 46, 86, 102, 60 and 118 are closed and valves 82, 40, 98 and 62 are opened. Also the combustion chamber 42 of reactor 12 is fed with oxygen through a pipe 120 containing a valve 122 that admits a regulated amount of oxygen to the combustion chamber 42 while the reactor 12 is operating as a reduction reactor.

As has been pointed out above, the circulating reducing gas in the reduction gas circuit preferably contains a relatively high proportion of methane and consists essentially by volume of 15 to 40% carbon monoxide, 15 to 50% hydrogen, 5 to 40% carbon dioxide and 10 to 60% methane. Preferably the proportions of methane, carbon monoxide and hydrogen are each of the order of 15 to 35% in the gas which enters the pre-heater. A typical example of the approximate gas composition at various points in the reduction circuit is given in the table below.

|  | Inlet to preheater | Inlet to combustion chamber | Outlet of combustion chamber | Outlet of catalytic zone of bed | Outlet of ore bed |
|---|---|---|---|---|---|
| $H_2$ | 34 | 34 | 42 | 45 | 45 |
| $CO$ | 19 | 19 | 31 | 32 | 26 |
| $CH_4$ | 33 | 33 | 18 | 15 | 13 |
| $CO_2$ | 14 | 14 | 9 | 8 | 16 |

As illustrated in FIG. 1, the ore body 14 of reactor 10 has an overlying layer 16 of sponge iron which serves as a catalyst to convert portions of the methane in the reducing gas to carbon monoxide and hydrogen. However, referring to FIG. 2 of the drawings, this catalyst bed identified as 16 in FIG. 1 can also be located in the combustion chamber 36 as shown in FIG. 2. Referring to FIG. 2, location of the catalyst layer 16 in combustion chamber 36 rather than in the main portion of the reactor has the advantage that a catalytic material other than sponge iron, e.g., nickel oxide or alumina, may be used if desired. Also since the catalytic conversion of methane to carbon monoxide and hydrogen is endothermic, it tends to lower the temperature of the gas mixture. By locating the catalyst body 16 in the combustion chamber 36, oxygen may be added to the mixture after it passes through the catalyst to burn a further quantity of the gas mixture to offset this endothermic temperature drop. As shown in FIG. 2, a branch pipe 124 containing a regulating valve 126 is connected to the combustion chamber 36 between catalyst body 16 and reactor 10 for this purpose.

Referring next to FIG. 3 of the drawings, the system there shown is in most respects similar to that of FIG. 1 and hence its description will largely be limited to the differences between the two systems. In general, the system comprises a reactor 210 similar to reactor 10 of FIG. 1, a reactor 210 similar to reactor 12 of FIG. 1 and a preheater 224 similar to the preheater 24 of FIG. 1, a reducing gas recirculating pump 218 similar to reducing gas recirculating pump 18 of FIG. 1 and a cooling gas recirculating pump 76 similar to the cooling gas recirculating pump 76 of FIG. 1.

Referring to the upper right-hand portion of FIG. 3, the system of this figure differs from that of FIG. 1 primarily in that the make-up methane is initially fed through pipe 226 containing flow controller 228 to the cooling circuit of the cooling reactor 212, rather than to the reducing gas circuit of the reduction reactor 210. More particularly, the entering methane flows through pipe 226 and either a pipe 350 containing shut-off valve 352 or pipe 354 containing shut-off valve 356. During the early portion of a cycle, valve 356 is closed and valve 352 is open. Thus the methane flows to the cooling gas recirculation header 278.

Assuming that reactor 210 is operating as a reduction reactor and reactor 212 as a cooling reactor, the cooling gas circuit comprises reactor 212, pipe 288, cooler 290, pipe 292, pipe 300, pipe 304, pump 276, pipe 274, header 278 and pipe 284. A portion of the circulating cooling gas is continuously transferred to the reducing gas circuit. More particularly, at or near the junction of pipes 300 and 304, gas is withdrawn through pipe 358 containing check valve 360 and flow controller 361 and enters the reducing gas circuit via pipe 220 which connects the discharge of pump 218 with the heating coil of heater 224. The volumetric ratio of recirculating cooling gas to gas entering through pipe 350 may be within the same range as that indicated for the system of FIG. 1, i.e., 1:1 to 10:1.

The reducing gas circuit of the system of FIG. 3 comprises, in addition to reactor 210, the effluent gas pipe 248, cooler 250, pipe 252, pipe 256, pipe 266, pump 218, pipe 220, heater 224, pipe 230, pipe 232, and combustion chamber 236. Gas is withdrawn from the reducing gas circuit and more particularly pipe 256 thereof through a pipe 362 containing a back pressure controller 364 and flows therethrough to the burners 314 of heater 224. The volumetric ratio of the gas recycled through the reducing gas circuit to the gas entering the circuit through pipe 358 may be within the same range as indicated for the system of FIG. 1, i.e., 1:1 to 10:1.

As in the case of FIG. 1, the time interval for cooling the reduced ore in reactor 212 is desirably made shorter than the time interval for carrying out the reduction reaction in reactor 210 by an amount sufficient to permit discharging of the cooled sponge iron from reactor 212 and recharging it with fresh ore. During this discharging and charging of reactor 212, the inlet methane is fed directly to the reducing gas circuit. More particularly, valve 352 is closed and valve 356 opened to cause the entering methane to flow through pipe 354 to pipe 358 and thence to the pipe 220 of the reducing gas circuit.

In the system of FIG. 3 like that of FIG. 1, connections are provided whereby at the end of a cycle the reactor 212 may be made a reduction reactor and the reactor 210 a cooling reactor. Since these connections have been described in detail in FIG. 1, it is deemed unnecessary to describe them in detail in connection with FIG. 3.

It should be noted that in the system of FIG. 3 wherein the incoming methane flows through the cooling reactor containing a bed of sponge iron that is initially at a relatively high temperature, the sponge iron acts as a catalyst to convert a considerable portion of the methane to hydrogen and carbon monoxide. This production of hydrogen and carbon monoxide in the initial portion of the cooling cycle tends to compensate for a somewhat lower conversion in the early portion of the reduction cycle in reactor 210. As the temperature of the sponge iron in reactor 212 drops, the extent of conversion of methane to hydrogen and carbon monoxide also drops. However, by this time the temperature of the ore body in reactor 210 has increased and thus the conversion of methane to carbon monoxide in the reduction reactor has increased. Thus in the system of FIG. 3 the layer of sponge iron 16 shown in reactor 10 can be omitted with little, if any, change in the overall efficiency.

In the system shown in the drawings and described above, the reduction, cooling and charge and discharge cycles can be varied over a relatively wide range. Thus the reduction cycle may be of the order of 2 to 6 hours, and the charge and discharge of the order of 2 to 3 hours. As pointed out above, the sum of the cooling time and charge and discharge time is desirably made approximately equal to the length of the reduction cycle so that both reactors will be fully utilized. It has been found that the consumption of hydrocarbon gas, e.g., natural gas or methane in systems of the type described herein usually falls within the range of 200 to 700 cubic meters per ton of iron produced.

From the foregoing description it should be apparent that the present process provides an exceptionally efficient ore reduction process capable of achieving the objects set forth at the beginning of the present specification. The reduction potential of the hydrocarbon gas used as a starting material in preparing the reducing gas is more effectively used than in prior gaseous reduction processes. By using a gas composition wherein the methane, hydrogen and carbon monoxide are present in roughly equal amounts, the methane is stabilized against destructive decomposition within the reduction reactor and the reduction reaction is less endothermic, thereby providing a higher average reduction temperature in the reactor for a given inlet gas temperature. Also in the preferred embodiment described above wherein only two reactors and one gas heater are used, the initial cost of the apparatus is relatively low.

In addition, the present process provides a number of other practical advantages over the prior process described above. Thus the plant is easier to start up and shut down. Labor and maintenance costs are less. The plant can easily be scaled up from say 20 tons of sponge iron per day to 1200 or more tons per day. The gas consumption per ton of iron can be reduced to well below 600 cubic meters/ton.

It is, of course, to be understood that the foregoing description is intended to be illustrative only and that numerous changes can be made in the materials, proportions and conditions referred to without departing from the scope of the invention. For example, while the preferred systems described above comprise only two reactors, it is also possible to use a combination of three reactors, namely, a reduction reactor, a cooling reactor and a separate charging and discharging reactor. In such a system the gas flows are desirably so adjusted as to make the length of the reduction and cooling cycles approximately equal. Also while the process has been described in connection with the reduction of iron ore to sponge iron, it may also be used in recovering other elemental metals such as nickel, copper, tin, titanium, barium and calcium from their ores.

Other modifications within the scope of the invention will be apparent to those skilled in the art.

We claim:

1. In a method for the gaseous reduction of metal ores to sponge metal in a multi-stage reactor system comprising a reduction reactor and a cooling reactor, said system being of the type in which fixed separate bodies of metal-bearing material are simultaneously treated in said reduction reactor and cooling reactor and a reducing gas is caused to flow successively through the body of metal-bearing material in the reduction reactor and the body of metal-bearing material in the cooling reactor, said reactors being provided with combustion chambers communicating with the inlet ends thereof, the steps of heating a first stream of reducing gas consisting essentially by volume of 14 to 40% carbon monoxide, 4 to 40% carbon dioxide, 15 to 50% hydrogen and 10 to 60% methane to a temperature of 750° to 900° C., causing said heated first stream to flow to the combustion chamber associated with said reduction reactor, mixing oxygen with said first stream in said combustion chamber to burn a portion of said first stream and raise the temperature of the mixture to 800° to 1200° C. and to partially oxidize a portion of the methane therein to carbon monoxide and hydrogen, thereafter passing the partially burned first stream through a body of metal ore in said reduction reactor to reduce said ore to sponge metal, removing the effluent gas from said reactor and cooling it, dividing the cooled effluent gas into a second and third stream, recycling said second stream to form said first stream and thereby establish a reducing gas circuit, adding make-up hydrocarbon gas to the gas flowing through said reducing gas circuit, and using said third stream as a source of cooling gas for said cooling reactor.

2. A method according to claim 1 wherein said first stream after being mixed with oxygen in said combustion chamber is passed through a body of catalyst to convert a further portion of its methane content to carbon monoxide and hydrogen.

3. A method according to claim 2 wherein said catalyst body is sponge iron and is located in said reduction reactor on top of the ore body therein.

4. A method according to claim 2 wherein said catalyst body is located in said combustion chamber.

5. A method according to claim 4 wherein a further quantity of oxygen is added to said first stream after it passes through said catalyst body.

6. A method according to claim 1 wherein the volumetric ratio of recycled gas to added hydrocarbon gas is from 1:1 to 10:1.

7. A method according to claim 1 wherein cool reducing gas is passed through the body of metal-bearing material in said cooling reactor, cooled and recycled to said cooling reactor to form a cooling gas circuit, said third stream is fed to said cooling gas circuit, and gas is removed from said cooling gas circuit at a rate to maintain the pressure in said cooling gas circuit substantially constant.

8. A method according to claim 7 wherein the volumetric ratio of circulating cooling gas to the gas fed to the cooling gas circuit by said third stream is from 1:1 to 10:1.

9. In a method for the gaseous reduction of metal ores to sponge metal in a multi-stage reactor system comprising a reduction reactor and a cooling reactor, said system being of the type in which fixed separate bodies of metal-bearing material are simultaneously treated in said reduction reactor and cooling reactor and a reducing gas is caused to flow successively through the body of metal-bearing material in the cooling reactor and the body of metal-bearing material in said reduction reactor, said reactors being provided with combustion chambers communicating with the inlet ends thereof, the steps of passing a first stream of cool reducing gas consisting essentially by volume of 15 to 40% carbon monoxide, 5 to 40% carbon dioxide, 15 to 50% hydrogen and 10 to 60% methane through the body of metal-bearing material in said cooling reactor, cooling the effluent gas from said cooling reactor, dividing the cooled effluent gas into a second and third stream, recycling said second stream to form said first stream and thereby establish a cooling gas circuit, feeding make-up hydrocarbon gas to said cooling gas circuit, heating a fourth stream of reducing gas consisting essentially of carbon monoxide, carbon dioxide, hydrogen and 10 to 60% by volume of methane to a temperature of 750° to 900° C., causing said heated fourth stream to flow to the combustion chamber of said reduction reactor, mixing oxygen with said fourth stream to raise the temperature of the mixture to 800° C. to 1200° C. and to partially oxidize a portion of the methane therein to carbon monoxide and hydrogen, thereafter passing the partially oxidized fourth stream through a body of ore in said reduction reactor to reduce said ore to sponge metal, cooling the effluent gas from said reduction reactor and recycling it to form said fourth gas stream, thereby establishing a reducing gas circuit, feeding said third stream to said reducing gas circuit and removing gas from said reducing gas circuit at a rate to maintain the pressure in said reducing gas circuit substantially constant.

10. A method according to claim 9 wherein said fourth stream after being mixed with oxygen in said combustion chamber is passed through a body of catalyst to convert a further portion of its methane content to carbon monoxide and hydrogen.

11. A method according to claim 10 wherein said catalyst body is sponge iron and is located in said reduction reactor on top of the ore body therein.

12. A method according to claim 10 wherein said body of catalyst is located in said combustion chamber.

13. A method according to claim 12 wherein a further quantity of oxygen is added to said fourth stream in said combustion chamber after it passes through said body of catalyst.

14. A method according to claim 9 wherein the volumetric ratio of said second stream to said make-up hydrocarbon gas is from 1:1 to 10:1.

15. A method according to claim 9 wherein the volumetric ratio of said fourth stream to said third stream is from 1:1 to 10:1.

16. A method according to claim 1 wherein reduction of the ore is effected in a period of 2 to 6 hours.

17. A method according to claim 1 wherein cooling of the reduced ore is effected in a period of 1 to 5 hours.

18. A method according to claim 1 wherein said metal ore is iron ore and said reduced ore is sponge iron.

19. A method according to claim 9 and wherein said metal ore is iron ore and said reduced ore is sponge iron.

References Cited
UNITED STATES PATENTS 3,635,456 1/1972 Anthes et al. ......... 75—34 X
3,684,486 8/1972 Osman .............. 75—34

L. DEWAYNE RUTLEDGE, Primary Examiner

M. J. ANDREWS, Assistant Examiner